(12) United States Patent
Wavering et al.

(10) Patent No.: US 6,671,055 B1
(45) Date of Patent: Dec. 30, 2003

(54) INTERFEROMETRIC SENSORS UTILIZING BULK SENSING MEDIUMS EXTRINSIC TO THE INPUT/OUTPUT OPTICAL FIBER

(75) Inventors: Thomas A. Wavering, Blacksburg, VA (US); Scott A. Meller, Blacksburg, VA (US); Jason W. Borinski, Blacksburg, VA (US); Wade J. Pulliam, Blacksburg, VA (US); Patrick M. Russler, Raleigh, NC (US)

(73) Assignee: Luna Innovations, Inc., Blacksburg, VA (US)

( * ) Notice: Subject to any disclaimer, the term of this patent is extended or adjusted under 35 U.S.C. 154(b) by 0 days.

(21) Appl. No.: 09/548,972

(22) Filed: Apr. 13, 2000

(51) Int. Cl.[7] .................................................. G01B 9/02
(52) U.S. Cl. ..................................................... 356/478
(58) Field of Search ................................. 356/477, 478, 356/480, 519; 250/227.19, 227.27; 385/12

(56) References Cited

U.S. PATENT DOCUMENTS

| 4,703,174 | A |   | 10/1987 | Anderson et al. |        |
|-----------|---|---|---------|-----------------|--------|
| 4,932,263 | A |   | 6/1990  | Wlodarczyk      |        |
| 4,942,767 | A |   | 7/1990  | Haritonidis et al. |     |
| 5,052,228 | A |   | 10/1991 | Haritonidis     |        |
| 5,087,124 | A |   | 2/1992  | Smith et al.    |        |
| 5,301,001 | A |   | 4/1994  | Murphy et al.   |        |
| 5,381,229 | A |   | 1/1995  | Murphy et al.   |        |
| 5,414,507 | A |   | 5/1995  | Herman et al.   |        |
| 5,452,087 | A |   | 9/1995  | Taylor et al.   |        |
| 5,582,170 | A | * | 12/1996 | Soller          | 385/12 |
| 5,612,778 | A | * | 3/1997  | Hall et al.     | 356/477 |
| 5,682,237 | A | * | 10/1997 | Belk            | 356/478 |
| 5,841,529 | A | * | 11/1998 | Sirkis          | 356/481 |
| 5,844,667 | A |   | 12/1998 | Maron           |        |
| 5,892,860 | A |   | 4/1999  | Maron et al.    |        |
| 5,907,403 | A | * | 5/1999  | Andrews et al.  | 356/480 |
| 6,014,215 | A |   | 1/2000  | Kempen et al.   |        |
| 6,016,702 | A |   | 1/2000  | Maron           |        |
| 6,056,436 | A | * | 5/2000  | Sirkis et al.   | 356/519 |

OTHER PUBLICATIONS

W. Pulliam, M. Jones, J.A.Schetz, K. Murphy, "Fiber Optic Pressure/Skin Friction Gage for Supersonic Flow Applications," International Congress on Instrumentation in Aerospace Simulation Facilities, Pacific Grove, CA, Sep. 27–Oct. 2, 1997.

(List continued on next page.)

*Primary Examiner*—Samuel A. Turner
(74) *Attorney, Agent, or Firm*—Joy L. Bryant

(57) ABSTRACT

The present invention is directed toward an interferometric sensor that permits the simultaneous measurement of a change in more than one environmental condition. The interferometric sensor comprises an optical fiber and a plurality of sensing regions positioned in an operable relationship to the optical fiber. Each sensing region has partially reflective boundaries and produces an interferometric signal.

15 Claims, 6 Drawing Sheets

OTHER PUBLICATIONS

K.A. Murphy, C.E. Koob, A.J. Plante, S. Desu, R.O. Claus, "High Temperature Sensing Applications of Silica and Sapphire Optical Fibers," *SPIE, Fiber Optic Smart Structures and Skins III* , 1990, pp. 169–178, vol. 1370.

D.L. Gardner, T. Holfer, S.R. Baker, R.K. Yarber, S.L. Garrett, "A Fiber–Optic Interferometric Seismometer," *Journal of Lightwave Technology* , Jul. 1987, pp. 953–959, vol. LT–5, No. 7.

Jose Miguel Lopez–Higuera, Miguel A. Morante, Adolfo Cobo, "Simple Low–Frequency Optical Fiber Accelerometer with Large Rotating Machine Monitoring Applications," *Journal of Lightwave Technology*, Jul. 1997, pp. 1120–1129, vol. 15, No. 7.

A.S. Gerges, T.P.Newson, D.A. Jackson, "Practical Fiber–Optic–Based Submicro–g Accelerometer Free From Source and Environmental Pertubations," *Optics Letters*, Oct. 15, 1989, pp. 1155–1157, vol. 14, No. 20.

A.S. Gerges, T.P. Newson, J.D.C. Jones, D.A. Jackson, "High–Sensitivity Fiber–Optic Accelerometer," *Optics Letters*, Feb.15, 1989, pp. 251–253, vol.14, No. 4.

T. Wavering, J. Greene, S. Meller, P. Furrow, R. Clark, Jr., C. Kozikowski, T. Bailey, K. Murphy, "NDE Characterization of Composites with High Temperature Optical Fiber Sensors," 44th *International Sampe Symposium and Exhibition: Evolving and Revolutionary Technologies for the New Millennium* , Long Beach, California, May 23–27, 1999, pp. 1255–1264, vol. 44, Book 2.

* cited by examiner

INTERFEROMETRIC SENSORS UTILIZING BULK SENSING MEDIUMS EXTRINSIC TO THE INPUT/OUTPUT OPTICAL FIBER

FIELD OF THE INVENTION

The present invention relates to fiber optic sensors. In particular, it relates to an interferometric sensor that is capable of making simultaneous measurements for a variety of environmental conditions.

BACKGROUND OF THE INVENTION

The simultaneous measurement of various environmental conditions such as temperature and pressure is critical for numerous aerospace, medical, industrial, and automotive applications. In many instances, a temperature measurement is needed to compensate for the thermal sensitivity of a pressure sensor. This is especially true for optical fiber pressure sensors where high operating temperatures and high sensitivity measurement is needed.

Several approaches have been used to thermally compensate optical fiber pressure sensors. One approach is to co-locate separate pressure and temperature sensors in the same environment. The reading from the temperature sensor can then be used to correct for temperature induced pressure measurement error which has been previously characterized. However, this approach has certain limitations in that it necessitates multiple fibers and/or leads, complex signal processing, and is an inexact measurement of the pressure sensor's temperature.

Herman et al. (U.S. Pat. No. 5,414,507) describe a mechanical design to compensate for temperature. Their fiber optic pressure sensor is a transducer that utilizes fiber optics in an interferometric sensing element. In this arrangement, a temperature compensator is attached to the sensing or reference optical fiber of the interferometer. The temperature compensator causes corrective changes in the length of the optical fiber to which it is attached, thereby compensating for opposing temperature effects on other parts of the interferometer. A bellows-type pressure-to-movement converter translates sensed pressure into linear displacement. That displacement is mechanically coupled to, and thereby varies the length of, one leg of a fiber optic interferometer as a function of pressure. The disadvantage of this type of sensor arrangement is that it is limited to applications where larger, less accurate measurement is acceptable.

Maron (U.S. Pat. No. 5,844,667) discloses a temperature compensated intrinsic optical fiber pressure sensing device. The intrinsic fiber optic sensor is formed in the core of an optical fiber. A diaphragm that is responsive to pressure in an environment applies a longitudinal strain in the optical fiber, thereby inducing a pressure stress in the intrinsic fiber optic sensor. The intrinsic fiber optic sensor responds to a pressure stress that provides a sensing light signal indicative of the pressure. Temperature compensation members respond to temperature through an applied longitudinal strain in the optical fiber, thereby inducing a temperature compensation stress in the intrinsic fiber optic sensor indicative of the temperature. Changes in the sensing light signal that are attributable to changes in the temperature compensation strain substantially compensate for changes in the sensing light signal attributable to changes in the temperature of the intrinsic fiber optic sensor. This type of sensor has its limitations in that the measurement obtained is limited to applications where larger, less accurate measurement is acceptable.

Maron (U.S. Pat. No. 6,016,702) describes a pressure sensor that includes at least one intrinsic fiber optic sensor element formed within a core of an optical fiber. A temperature compensation sensor is also formed in the fiber near the location of the pressure sensor or alternatively, temperature compensation is provided by an intrinsic fiber optic sensor element mounted to experience an equal but opposite strain associated with changes in the dimension of the pressure sensitive structure. In particular, the pressure sensor utilizes resonant structures or Bragg gratings that are disposed at one or more locations within the waveguiding core of an optical fiber. Bragg gratings are optical gratings written into a fiber for highly multiplexed measurement of strain and temperature. By using a complicated sensor housing design, changes in pressure induce strain in the fiber which is measured with two multiplexed Bragg gratings. Each Bragg grating sensor measures the strain and temperature seen by the optical fiber. One of the sensors is mechanically coupled to the housing which converts changes in pressure to strain on the fiber, while the other sensor is strain isolated to measure only temperature. The challenge of this design is the complicated housing required to minimize the extensive cross-sensitivity of the sensors.

These prior approaches have many limitations. Any approach that uses a mechanical means for thermally compensating pressure is limited in size, operating temperature, accuracy, commercialization, as well as it does not actually provide a temperature measurement. Approaches that use an electrical thermocouple and an optical fiber sensor suffer from the traditional limitations of electrical based gages, which is often why optical fiber gages are used in the first place. Approaches that employ multiple optical fiber sensors to measure temperature and pressure often require multiple leads and are limited in their effectiveness for thermal compensation because the sensors are not a single device. In addition, approaches that use Bragg gratings are typically limited to operating temperatures below 1000° C.

Extrinsic Fabry-Perot interferometeric (EFPI) sensors are based on a combination of two light waves and are described in U.S. Pat. No. 5,301,001 to Murphy et al. which is incorporated by reference herein. A typical EFPI sensor consists of a single-mode input fiber and a reflector fiber aligned by a hollow core silica tube. The operation of an EFPI can be approximated as a two beam interferometer. When the laser diode light arrives at the source fiber end-face, a portion is reflected off the fiber/air interface (R1) and the remaining light propagates through an air gap (L) with a second reflection occurring at the air/fiber interface (R2). In an interferometric sense, R1 is the reference reflection and R2 is the sensing reflection. These reflective signals interfere constructively or destructively based on wavelength and the optical path length difference between the reference and sensing fibers. Small movements in the hollow core cause a change in the gap length, which changes the phase difference between the sensing and reflecting waves producing fringes.

Haritonidis et al. (U.S. Pat. No. 4,942,767) describe one form of a fiber optic sensor where a micromachined diaphragm is positioned across a gap from an end of an optical fiber. The end of the optical fiber provides a local reference plane which splits light carried through the fiber toward the diaphragm. The light is split into a transmitted part which is subsequently reflected from the diaphragm, and a locally reflected part which interferes with the subsequently diaphragm reflected part. The interference of the two reflective parts forms an interference light pattern carried back through the fiber to a light detector. The interference pattern provides an indication of diaphragm deflection as a function of applied pressure across the exposed side of the diaphragm. To detect the magnitude and direction of diaphragm deflection, a second fiber is positioned across the gap from the diaphragm. The second fiber provides an interference pattern in the same manner as the first fiber but with a phase shift. This device has several shortcomings. In particular, the diaphragm must be completely reflective in order to obtain an accurate measurement. In addition, there is no way to compensate for temperature effects on the sensor.

An object of the present invention is to provide an interferometric sensor that can be used to monitor a plurality of environmental conditions from the same location at the same time.

Another object of the present invention is to provide an interferometric sensor that employs a single optical fiber or sensor lead.

Another object of the present invention is to provide an interferometric sensor having a flexible sensor platform.

SUMMARY OF THE INVENTION

By the present invention, an interferometric sensor is provided. The sensor may be used for various medical, automotive, aerospace, and process monitoring applications. The interferometric sensor comprises an optical fiber and a plurality of sensing regions positioned in an operable relationship to the optical fiber. Each sensing region has partially reflective boundaries and is capable of producing an interferometric signal. The interferometric sensor may operate as an extrinsic, intrinsic, or combination extrinsic/intrinsic sensor depending on the desired application.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1A:
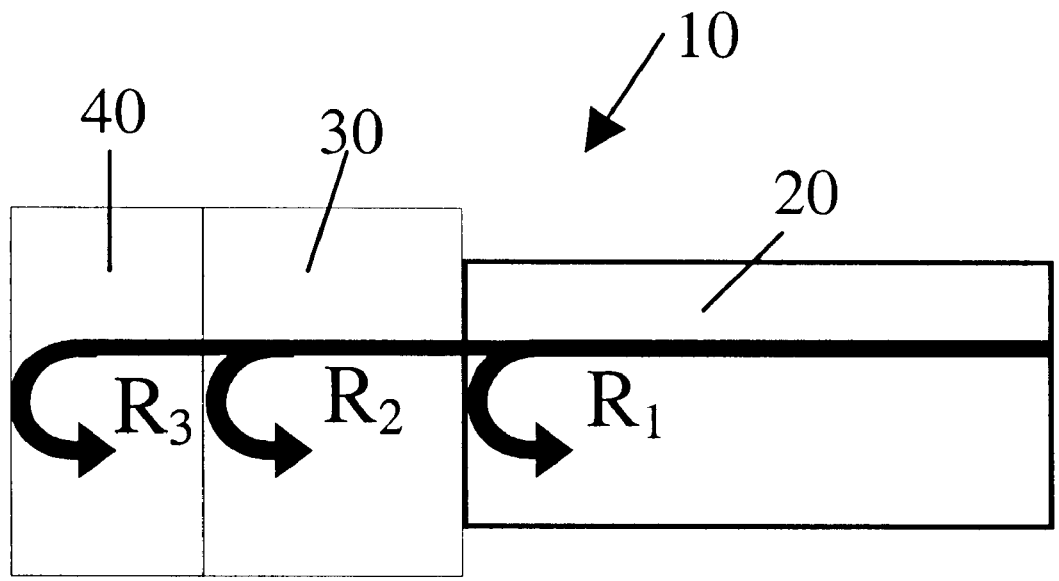
FIGS. 1A–1D are side views of various configurations of the interferometric sensor of the present invention.
Figure 1B:
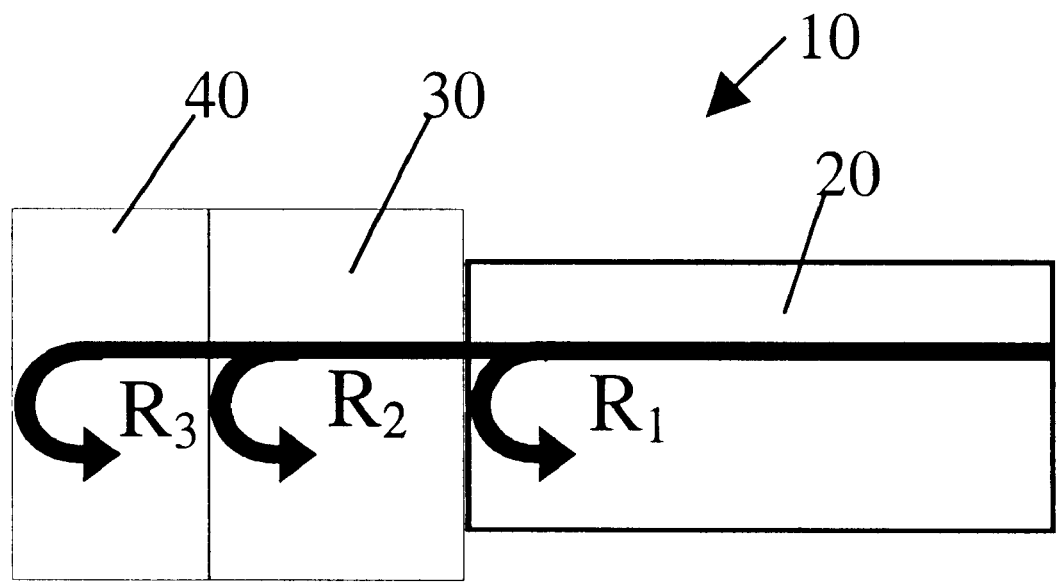
Figure 1C:
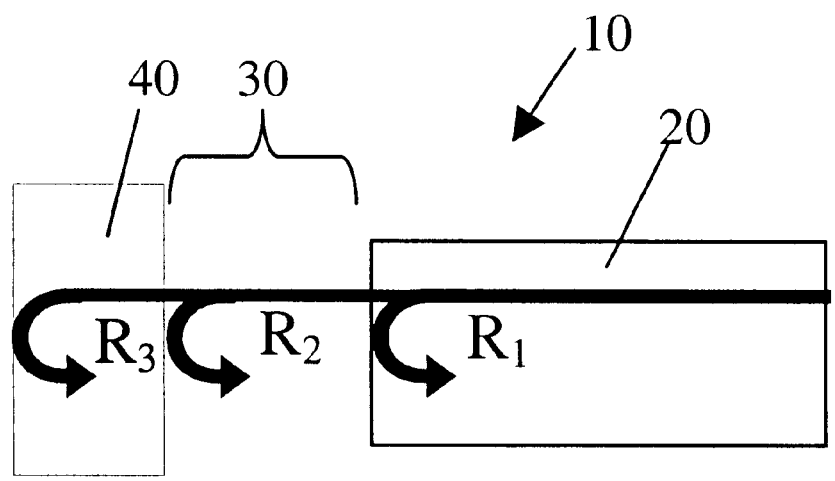
Figure 1D:
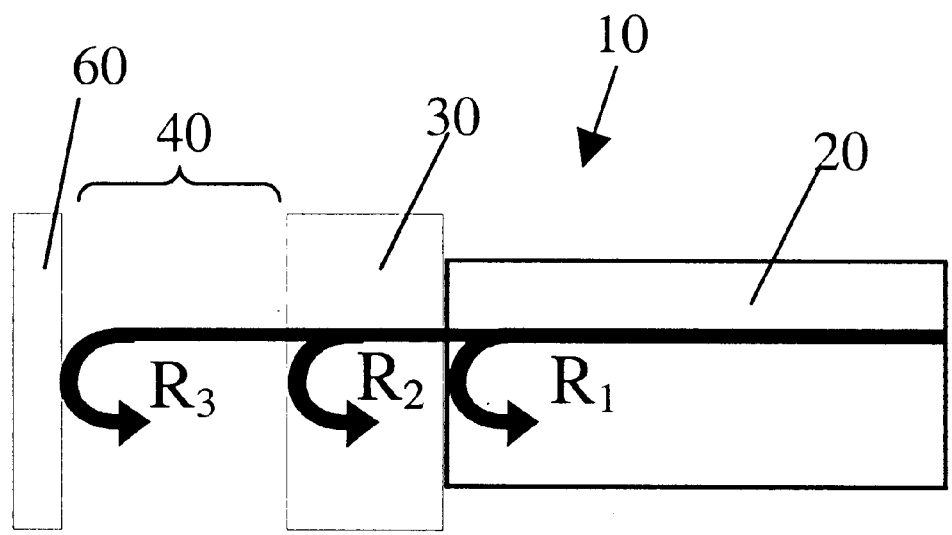
Figure 2:
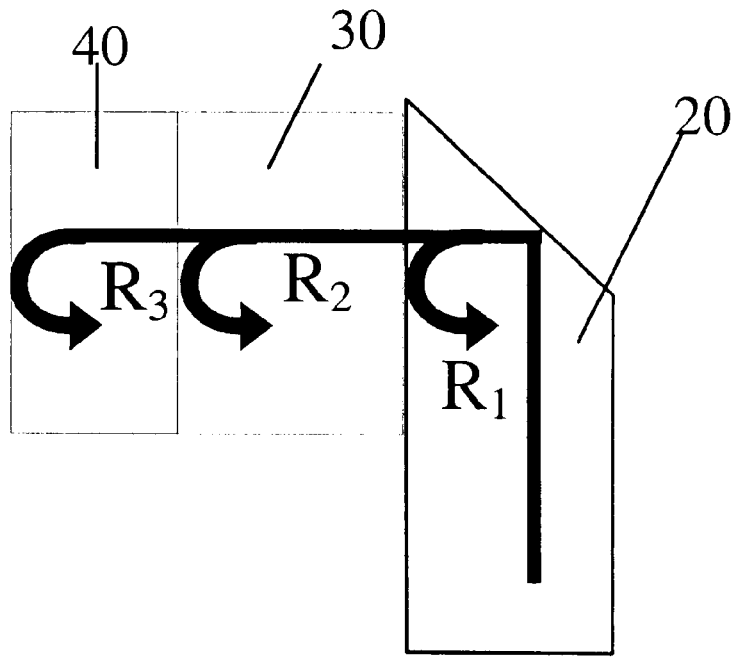
FIG. 2 is a side view of a low profile configuration of the interferometric sensor of the present invention.
Figure 3:
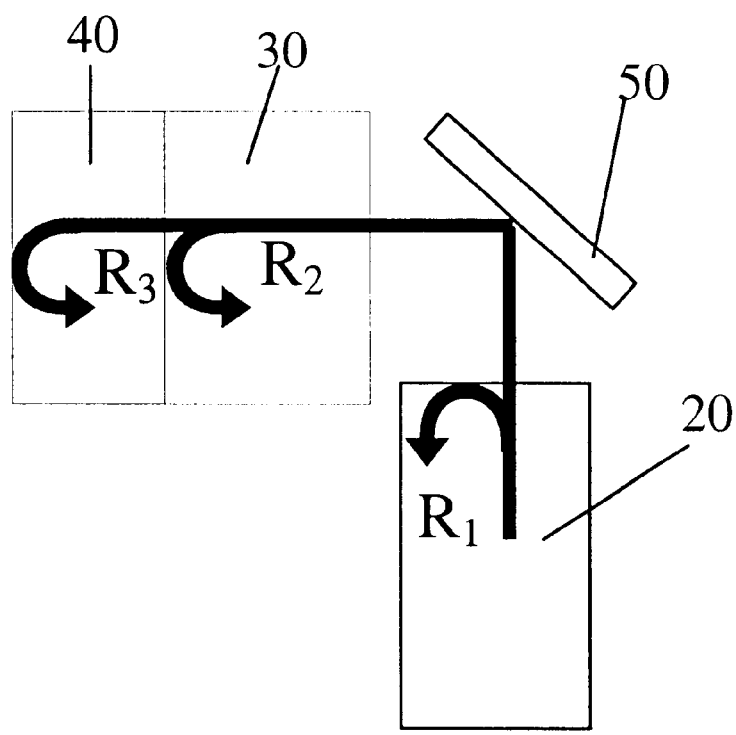
FIG. 3 is a side view of a low profile configuration of the interferometric sensor of the present invention which employs a reflector.

Referring now to the drawings where similar parts are labeled the same throughout, FIGS. 1A–1D depict various embodiments of the interferometric sensor 10 where the interferometric sensor 10, in general, comprises an optical fiber 20 and a plurality of sensing regions 30, 40 (only two are shown for simplicity) positioned in an operable relationship to the optical fiber 20. Each sensing region 30, 40 has partially reflective boundaries and produces an interferometric signal (shown as R1, R2, and R3). FIGS. 1A and 1B depict intrinsic sensor configurations where FIG. 1C depicts an extrinsic/intrinsic sensor configuration and FIG. 1D shows an intrinsic/extrinsic sensor configuration;

The optical fiber 20 employed in the present invention may be any optical fiber known to those of ordinary skill in the art. For example, the optical fiber 20 may be a single-mode optical fiber; a multi-mode optical fiber; or either a single-ended single-mode optical fiber or a single-ended multi-mode optical fiber. In addition, the optical fiber 20 may be modified to provide a low-profile configuration for the sensor 10. FIG. 2 depicts a low-profile configuration. In this embodiment, the optical fiber 20 has either a polished end at about a 45 degree angle or an end that has been cleaved at about a 45 degree angle. This end is positioned nearly orthogonal to the sensing regions 30, 40. FIG. 3 shows an alternative low-profile arrangement, where the optical fiber 20 has a straight end and an angled reflector 50 is positioned in an operable relationship to the optical fiber 20. The angled reflector 50 directs light into the sensing regions 30, 40 and redirects reflected light R1, R2, R3 back into the optical fiber. The optical fiber choice and configuration is dependent on the final application for the sensor.

Each sensing region 30, 40 senses at least one environmental condition. In particular, the environmental condition is selected from the group consisting of: strain, acceleration, wall shear stress, refractive index, heat flux, flow velocity, pressure, temperature, displacement, force, vibration, acoustic emission, optical path length, chemical concentration, biological concentration, and thickness. The environmental condition that is measured by each sensing region may be different or at least two sensing regions may sense the same environmental condition depending on the desired application. For example, a first sensing region may sense temperature; a second sensing region may sense pressure; and a third sensing region may sense strain. In contrast, a first and third sensing region may sense temperature and the second sensing region may sense pressure. Alternatively, multiple environmental conditions may be sensed by one sensing region. For example, one sensing region may sense both temperature and pressure changes.

In one embodiment of the invention, each sensing region comprises a sensing medium. For the purpose of this specification and the appended claims, a sensing medium is defined as a medium in which an intrinsic optical property changes in response to an environmental condition. More specifically, the sensing medium may be a gas (such as air), a fluid (such as water, an incompressible fluid, or a compressible fluid), a material, and combinations thereof. The material may be in several forms such as a chip, a partially reflective diaphragm, or a microcantilever beam. When a material serves as the sensing medium, the material has a refractive index and the refractive index changes when the material is exposed to a change in an environmental condition such as pressure or temperature. Any material known to those of ordinary skill in the art may be used. For example, silicon may be used for biological applications. Silicon carbide, silicon, sapphire, and silica may be used for heat flux and temperature measurements. A polymer and a gel may be used for pressure measurements. In addition, various combinations of materials may be employed depending on the application.

In an alternative embodiment of the invention, each sensing region may comprise a physically modulated cavity. For the purpose of this specification and the appended claims, a physically modulated cavity is defined as a cavity, that when exposed to an environmental condition, undergoes a change in cavity size. The physically modulated cavity results from a vacuum or a fluid (either a gas or a liquid) that is modulated by a device. Any device known to those of ordinary skill in the art may be used. In particular, the device is selected from the group consisting of: a piston, a bellows, a diaphragm, and a microcantilever beam.

Each sensing region may also comprise a physically modulated sensing medium. This type of medium displays the characteristic where an intrinsic optical property changes at the same time that a physical property changes as a result of exposure to an environmental condition.

Referring back to the drawings, FIG. 1C depicts a preferred embodiment of the invention wherein there are two sensing regions 30, 40. The first sensing region 30 is a pressure sensing region and is comprised of a physically modulated cavity. The second sensing region 40 is a temperature sensing region and is preferably a material in the form of a partially reflective pressure sensor diaphragm.

FIG. 1A shows another example where there are two sensing regions 30, 40. The first sensing region 30 is a pressure sensing region comprised of a material. The second sensing region 40 is a temperature sensing region comprised of a material such as silicon. Alternatively, the two regions may be switched such that the first sensing region 30 is a temperature sensing region comprised of a material such as silicon and the second sensing region 40 is a pressure sensing region comprised of a material, as shown in FIG. 1B.

FIG. 1D depicts a configuration of two sensing regions 30, 40 where the first sensing region 30 is a temperature sensing region comprised of a material such as silicon, and where the second sensing region 40 is a pressure sensing region that is a physically modulated cavity positioned between the material and a partially reflective diaphragm 60. Preferably the diaphragm is partially reflective, however, a totally reflective diaphragm would also make the invention operable.

Figure 4:
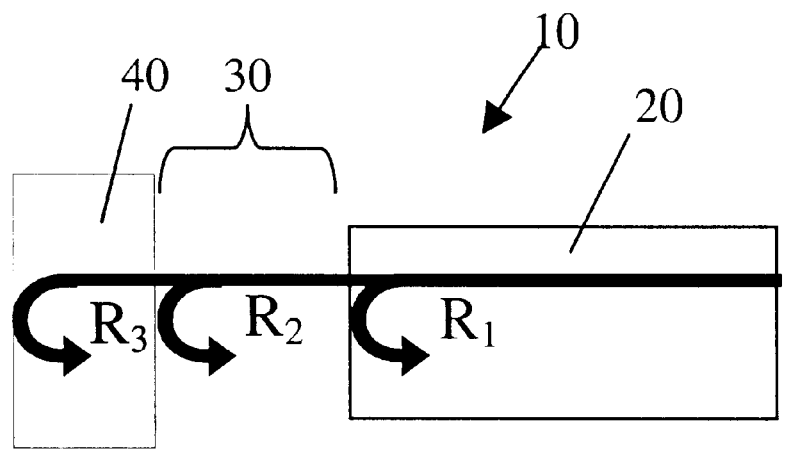
FIG. 4 is a side view of the interferometric sensor of the present invention when a partially reflective diaphragm serves as a sensing region.

FIG. 4 depicts a preferred embodiment for the invention, where the interferometric sensor 10 comprises a single-ended optical fiber 20 and a partially reflective diaphragm 40 spaced apart from an end of the single-ended optical fiber 20. A physically modulated cavity 30 is formed therebetween and serves as a pressure sensing region. The material that comprises the partially reflective diaphragm 40 serves as a temperature sensing region.

Figure 5:
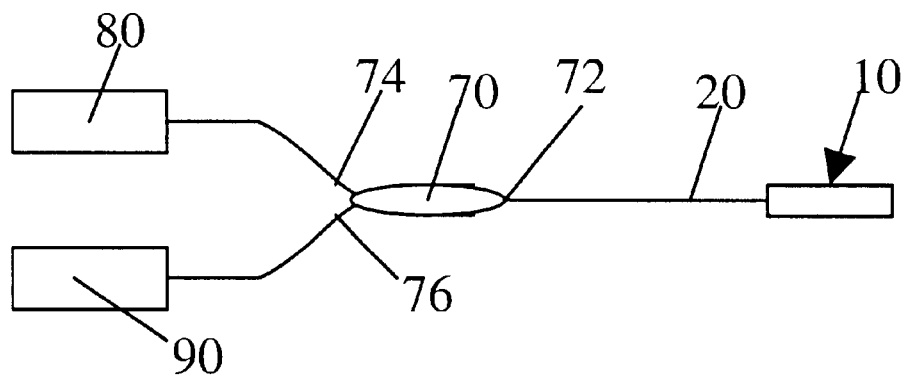
FIG. 5 is a schematic of the sensor arrangement for the present invention.

FIG. 5 is a schematic diagram of the optical arrangement for the present invention that may be used with any of the previously mentioned interferometric sensors. A coupler 70 has a first end 72 attached to an end of the optical fiber 20 opposite from the sensing regions 30, 40. A second end 74 of the coupler 70 is attached to a light source 80. A third end 76 of the coupler 70 is attached to a detector 90.

In use, light is launched from the light source 80 into and through the optical fiber 20. Referring now to FIG. 1A, when the light reaches the first and second sensing regions 30, 40, three interferometric signals are generated. The first signal R1R2, is caused by the interference of a reflection (R1) from the end of the fiber 20 or the near side of the first sensing region 30, and a reflection (R2) from the far side of the first sensing region 30 or the near side of the second sensing region 40. The second signal (R2R3) is caused by the interference of a reflection (R2) from the far side of the first sensing region 30 or the near side of the second sensing region 40 with the light that reflects off the far side of the second sensing region 40 (R3). The third signal (R1R3) is caused by the interference of a reflection (R1) from the end of the fiber 20 or the near side of the first sensing region 30 and a reflection (R3) from the far side of the second sensing region 40.

For example, in one embodiment of the invention, the R1R2 signal measures the change in the first sensing region 30 that may be due to several factors, such as pressure and temperature. However, the R2R3 signal measures the optical path length of the second sensing region which changes primarily due to one environmental condition such as temperature. The R1R3 signals measure the combination of the optical path lengths. In this manner, temperature can be measured with R2R3 and used to compensate the pressure measurement R1R2. Thus, the sensor can measure pressure and temperature simultaneously, at the same location by measuring the changes in the optical path length.

Various signal processing techniques are employed to separate the interferometric signals returned from the sensor regions. When a single interferometric sensor is interrogated with a broadband source, the returned spectrum is a "clean" fringe pattern. However, when the single interferometric sensor is replaced by one with multiple interferometric signals, the spectrum looks chaotic and typical signal processing approaches give erroneous results. In some cases the spectrum looks the same as might be returned from a broken or malfunctioning sensor. The sensor of the present invention uses optical path length multiplexing that enables multiple interferometric signals to be separated and tracked individually. The interferometric signals may be demodulated mathematically through known signal transformation techniques such as Fourier-Transform techniques or other known mathematical processes. Alternatively, the interferometric signals may be demodulated optically using known optical path-length matching techniques.

EXAMPLE

Figure 6A:
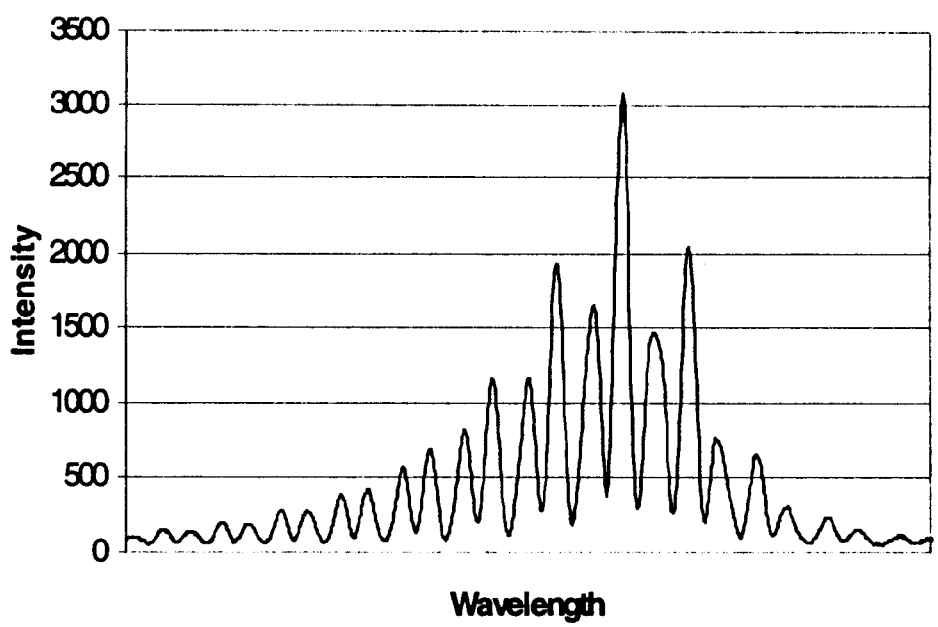
FIG. 6A is a returned wave spectrum for an interferometric sensor that measures pressure changes.
Figure 6B:
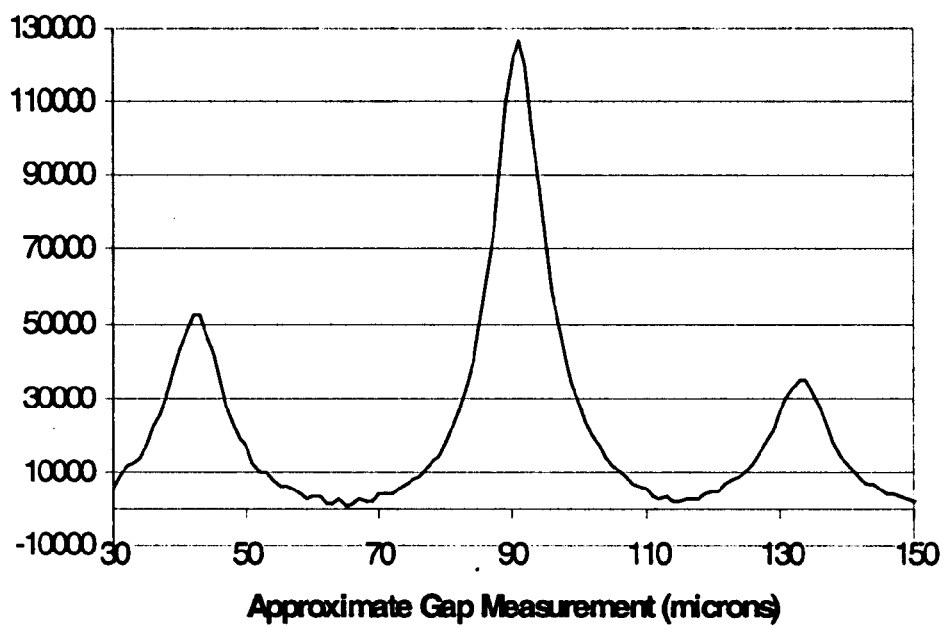
FIG. 6B is a demodulated spectrum showing three signals detected.

A pressure transducer was constructed with an optical fiber orthogonal to a partially reflective silicon diaphragm with a small air gap between the end of the fiber and the surface of the diaphragm. This transducer was connected to a source/detector box interfaced with a laptop computer. A sample returned spectrum and demodulated spectrum are shown in FIGS. 6A and 6B, respectively. The tip of each of the sensor peaks in FIG. 6B is the approximate measured optical path length of each sensor signal. These measurements were taken with the sensor at zero pressure and room temperature. The first peak, at around 42 $\mu$m, tracks the optical path length of the silicon diaphragm. Optical path length is the physical distance the light travels multiplied by the refractive index. By using this property, the thickness of the silicon diaphragm was calculated to be about 11 $\mu$m. The second peak, at around 90 $\mu$m, tracks the air gap between the fiber and the diaphragm. The third peak at around 132 $\mu$m tracks the optical path length between the end of the optical fiber and the far surface of the diaphragm.

Because the refractive index of silicon changes over temperature, the optical path length of the silicon diaphragm can be correlated to temperature. The temperature measurement is independent of applied pressure and can therefore be used to thermally compensate the pressure sensor. This method of thermal compensation has several advantages. The main advantage is that it does not require any additional sensors to measure temperature. Additionally, this transducer has the advantage of measuring temperature at the same location it measures pressure.

Figure 6C:
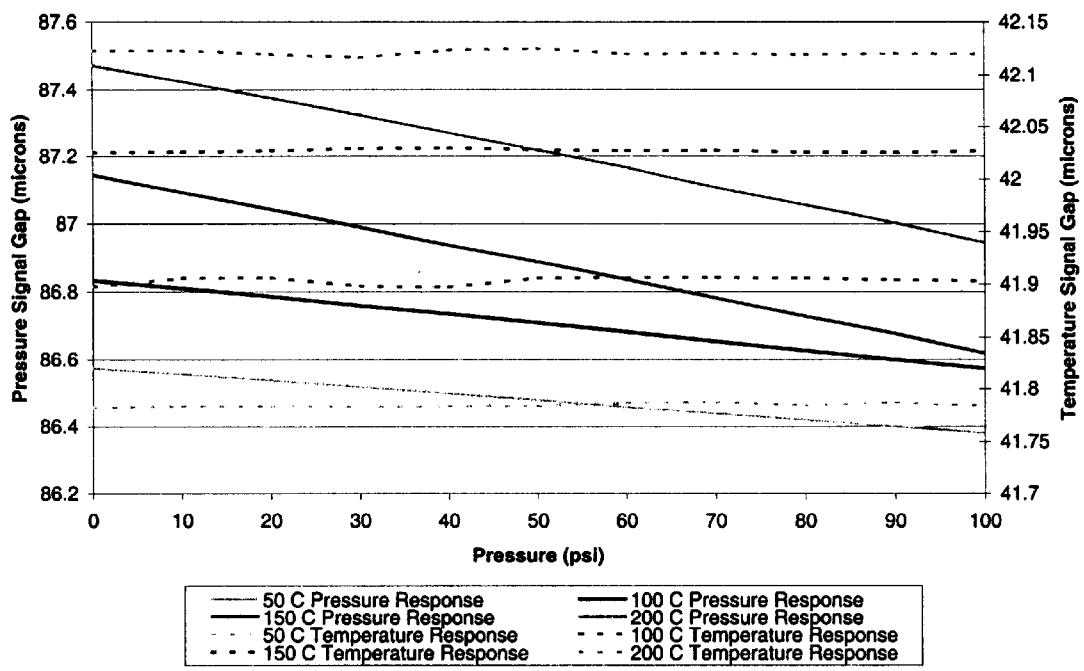
FIG. 6C depicts graphical results from the simultaneous testing of pressure and temperature.

In tests to demonstrate this principle, the pressure sensor described above was tested over different pressures at varying temperatures. The results can be seen in FIG. 6C. This graph verifies that the temperature signal responds only to changes in temperature. Although the graph shows that the pressure sensor performance changes over temperature, this graph also shows the capability to compensate for this effect.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. An interferometric sensor arrangement comprising:
   an input/output optical fiber positioned in an operable relationship to a plurality of bulk sensing mediums having physical and optical properties wherein the physical and optical properties of the bulk sensing medium change in response to an environmental condition; wherein each bulk sensing medium is extrinsic to the input/output optical fiber; and wherein each bulk sensing medium produces an interferometric signal.

2. An interferometric sensor arrangement according to claim 1, wherein there are two bulk sensing mediums and wherein the first bulk sensing medium is a physically modulated cavity and the second bulk sensing medium is a partially reflective pressure sensor diaphragm.

3. An interferometric sensor arrangement according to claim 1, wherein there are two bulk sensing mediums and wherein the first bulk sensing medium is a silicon material and the second bulk sensing medium is physically modulated cavity positioned between the silicon material and a partially reflective diaphragm.

4. An interferometric sensor arrangement according to claim 1, further comprising a coupler having a first end connected to the input/output optical fiber, the coupler having a second end attached to a light source, and the coupler having a third end attached to a detector.

5. An interferometric sensor arrangement according to claim 4, wherein the interferometric signal is demodulated mathematically using a signal transform technique.

6. An interferometric sensor arrangement according to claim 4, wherein the interferometric signal is demodulated optically through an optical path length matching technique.

7. An interferometric sensor arrangement according to claim 1, wherein there are two bulk sensing mediums and wherein the first bulk sensing medium is a physically modulated cavity and wherein the second bulk sensing medium is a silicon material.

8. An interferometric sensor arrangement according to claim 1, wherein there are two bulk sensing mediums and wherein the first bulk sensing medium is a silicon material, and the second bulk sensing medium is a physically modulated cavity.

9. An interferometric sensor arrangement according to claim 1, wherein the optical fiber is either a single-mode optical fiber or a multi-mode optical fiber.

10. An interferometric sensor arrangement according to claim 1, wherein the optical fiber is either a single-ended single-mode optical fiber or a single-ended multi-mode optical fiber.

11. An interferometric sensor arrangement according to claim 1, wherein the optical fiber has an endface at about a 45 degree angle and is positioned nearly orthogonal to the bulk sensing mediums.

12. An interferometric sensor according to claim 1, further comprising an angled reflector positioned in an operable relationship to the optical fiber wherein the angled reflector directs light into the bulk sensing medium and redirects reflected light back into the optical fiber.

13. An interferometric sensor arrangement according to claim 1, wherein the environmental condition is selected from the group consisting of: strain, acceleration, wall shear stress, refractive index, heat flux, flow velocity, pressure, temperature, displacement, force, vibration, acoustic emission, optical path length, chemical concentration, biological concentration, and thickness.

14. An interferometric sensor arrangement according to claim 1, wherein the environmental condition is pressure.

15. An interferometric sensor arrangement according to claim 1, wherein the environmental condition is temperature.

* * * * *